Patented Aug. 17, 1948

2,447,325

UNITED STATES PATENT OFFICE 2,447,325

PRODUCTION OF 3,11-OXYGENATED STEROIDS

Thomas F. Gallagher, Chicago, Ill., assignor to Research Corporation, New York, N. Y., a corporation of New York No Drawing. Application June 24, 1946, Serial No. 678,877

3 Claims. (Cl. 260—397.1)

This invention relates to the preparation of steroids of the general formula

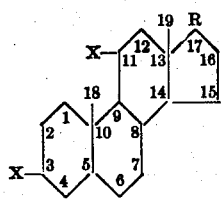

where R represents hydrogen or a monovalent substituent and the X's represent an oxygen function, that is, ketonic oxygen, hydroxyl, or an acylated or etherified hydroxyl. In the formula the hydrogens attached to the carbon atoms in positions 1 to 19 are omitted in accordance with the usual convention.

In general, the method of the invention comprises the conversion of 3(α)-hydroxy-12-keto steroids (I) to the corresponding 3,12-dihydroxy-11-keto steroids by acylating the 3(α)-hydroxy group (II), brominating to give the two 11-bromo epimers (III), hydrolyzing the bromo-keto esters to the two epimeric 3,11-dihydroxy-12-keto steroids (IV), isomerizing (IV) by boiling with strong alkali to the corresponding 3,12-dihydroxy-11-keto steroids (V), differentially acylating the 3-hydroxy to give the 3-acyloxy-12-hydroxy-11-keto steroids (VI), replacing the 12-hydroxy with halogen (VII), replacing the halogen with hydrogen (VIII), and hydrolyzing the ester group on the 3-hydroxy to give the 3-hydroxy-11-keto steroid (IX), as shown by the following general outline:

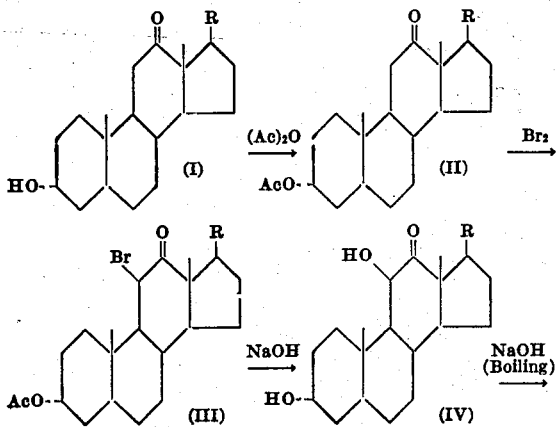

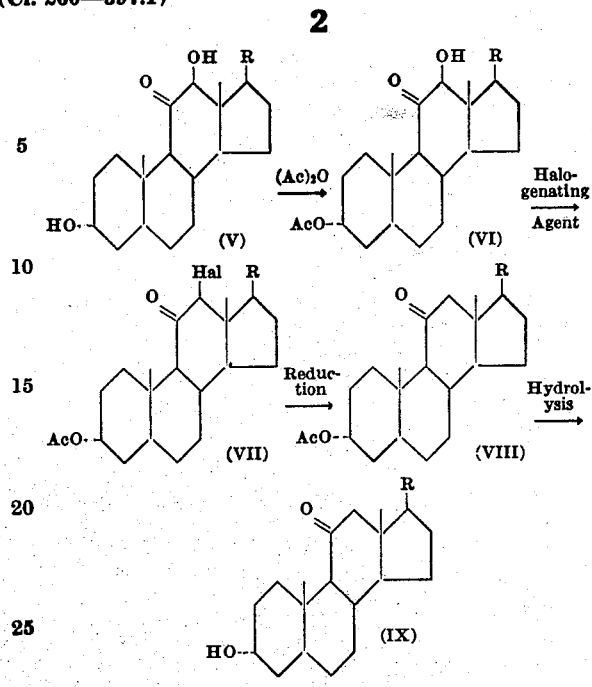

The 3-hydroxy-12-keto steroids are represented by the bile acid, desoxycholic acid, and its degradation products and derivatives, while the 3-hydroxy-11-keto steroids may be converted by known methods into the cortical hormones, corticosterone, 11-dehydrocorticosterone, and their derivatives of physiological importance.

In the general formulas given above, R may be hydrogen or any monovalent substituent. Of particular interest are the compounds in which R represents the side chain of desoxycholic acid (R=—CH(CH₃).CH₂.CH₂.COOH) or its degradation products (R=—CH(CH₃).CH₂.COOH, —CH(CH₃).COOH, —COOH) or derivatives thereof

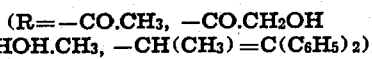

When R includes carboxylic acid groups or hydroxyl groups, they should be esterified or acylated before carrying out the halogenation operations.

The method of the invention is based in part on the discovery that acylation of the 3,12-dihydroxy-11-keto steroids proceeds differentially, the 3-hydroxy being considerably more readily acylated by acylating agents, such as anhydrides of carboxylic acids, for example, acetic anhydride and succinic anhydride. When anhydrides of dibasic acids, such as succinic anhydride, are used for the acylation, acid esters are produced which should be esterified, for example, with diazomethane, before replacing the 12-hydroxy with halogen.

Replacement of the 12-hydroxy with halogen is preferably effected at low temperatures in chloroform solutions. Such halogenating agents as phosphorus tribromide and trichloride, and thionyl bromide and chloride are useful for this purpose.

Reduction of the halogen to hydrogen may be effected by any of the methods well known for this purpose in the steroid compounds, such as the use of zinc dust and glacial acetic acid, chromous chloride solution (Conant and Cutter, J. A. C. S. 48:1023 (1926)), or by catalytic reduction, for example, with Raney nickel catalyst.

The following examples will serve to illustrate the principles of the invention (all temperatures are in degrees centrigrade):

1. *Methyl desoxycholate.*—Commercial desoxychloic acid [3($\alpha$)-12-dihydroxy cholanic acid] is first esterified by suspending 450 grams of well dried desoxycholic acid in approximately one liter of dry methanol, adding 0.5 to 1.0 cc. of concentrated sulphuric acid in 25 cc. of methanol and, after stoppering the flask, allowing the mixture to stand at room temperature for twenty-four hours. Over this period the desoxycholic acid dissolves and the methyl ester crystallizes. The reaction mixture is then filtered with suction, the precipitate washed well by suspension in very cold methanol and dried. The material obtained melts at 97°–102° C. (corrected) and, although somewhat impure, is satisfactory for use in the further steps of the process.

2. *3($\alpha$)-acetoxy-12-hydroxy methyl cholanate.*—400 grams of methyl desoxycholate obtained by step 1 are dissolved in 750 cc. of pyridine which has been distilled over barium oxide. To this solution, 165 cc. (1.6 mole) of freshly distilled acetic anhydride are added and the mixture allowed to stand at room temperature for nineteen hours. Ice and water are next added to the pyridine solution and this mixture is allowed to stand for one to two hours. The mixture of pyridine, water and acetic acid is then decanted, extracted twice with ether, the ether extract washed twice with water and all aqueous fractions discarded. The semi-crystalline residue obtained during the reaction is then dissolved in the ether and the resulting solution extracted with small portions of five per cent sulphuric acid—five per cent sodium carbonate and finally thoroughly with water. After drying over sodium sulfate, the ether is distilled off in the usual manner. The crystaline residue obtained may be recrystalized from methanol and melts at about 124°–126° C.

3. *3($\alpha$)-acetoxy-12-keto methyl cholanate.*—About 463 grams of the monoacetate obtained by step 2 are dissolved in 1500 cc. of glacial acetic acid which has been distilled over $CrO_3$. Heating is required to effect solution but before oxidation the solution is cooled to room temperature. To this solution 175 grams of $CrO_3$ dissolved in 800 cc. of water are added with stirring over a period of one to two hours. The reaction mixture is allowed to stand with continued stirring for another hour and then about 1500 cc. of water are added slowly while stirring is continued. The crystalline mass is filtered, washed twice by suspension in water, filtered as dry as possible and dissolved in ethanol. This requires a large volume of alcohol to effect solution and since the product crystallizes with great ease, the solution must be filtered while very hot. The crystalline product obtained, 3($\alpha$)-acetoxy-12-keto methyl cholanate, melts at about 147°–149° C. and is sufficiently pure for bromination purposes.

4. *3($\alpha$) - acetoxy - 11 - bromo-12-keto methyl cholanate.*—7.50 gm. of methyl 3($\alpha$)-acetoxy-12-ketocholanate, M. P. 147°–149°, are dissolved in 50 cc. of glacial acetic acid and 36 cc. of 1.041 normal bromine in acetic acid are added. 2 cc. of a solution of dry HBr in glacial acetic acid are added and the flask stoppered and stored in the dark for five days. The solution is poured into ether. The ether solution is washed 15 times with water and evaporated to dryness in a vacuum at room temperature.

5. *3,11-dihydroxy-12-ketocholanic acid.*—The bromo-ketones obtained in step 4 are dissolved in 75 cc. of 95% ethanol, 75 cc. of 4 normal NaOH are added, the flask stoppered and stored at —5° for 6 days. The insoluble crystalline salt of 3,11-dihydroxy-12-ketocholanic acid is filtered and washed with cold 2-normal sodium hydroxide. The filtrate is acidified and extracted with ether. The ether is evaporated and the residue dissolved in 75 cc. 2-normal NaOH, stoppered and stored at room temperature overnight and the precipitate removed. The filtrate is discarded.

6. *3,12-dihydroxy-11-ketocholanic acid.*—The two precipitates from step 5 are separately isomerized by heating under a reflux for 3 hours with 1.75 normal sodium hydroxide. The solutions are cooled, acidified and extracted with ether. The ether is evaporated and the residue dissolved in acetone and crystallized from that solvent. 4.54 gm. 3($\alpha$),12($\beta$)-dihydroxy-11-ketocholanic acid melting above 190° are obtained. The mother liquors yield a mixture of crystals and are, therefore, separated with the Girard reagent T.

7. *Methyl 3($\alpha$) - methylsuccinoxy - 11 - keto - 12($\beta$)-hydroxycholanate.*—1.50 grams of 3($\alpha$),-12($\beta$)-dihydroxy-11-ketocholanic acid from step 6 and 3.8 grams of succinic anhydride are dissolved in 20.0 ml. of anhydrous pyridine, and warmed between 70° and 95° for 30 minutes with exclusion of moisture. The mixture is then cooled to room temperature (25°) and stored for 24 hours. Excess succinic anhydride is hydrolyzed by addition of water and the product is obtained by extraction of the aqueous pyridine-succinic acid solution with ether. The ether solution is washed with dilute acid and with water, dried over anhydrous sodium sulfate and the ether distilled. The residue is dissolved in acetone and a small amount of unreacted 3($\alpha$),12($\beta$)-dihydroxy-11-ketocholanic acid removed by filtration. The acetone solution is treated with ethereal diazomethane. The ester is crystallized from methanol and 1.68 grams of methyl 3($\alpha$) - methylsuccinoxy - 11 - keto-12($\beta$) hydroxycholanate, M. P. 85–87°, are obtained. The pure compound melts at 90–91°, $[\alpha]_D^{25} = +63°$ (chloroform).

8. *Methyl 3($\alpha$) - methylsuccinoxy - 11-keto-12-bromocholanate.*—1.21 grams of methyl 3($\alpha$)-methylsuccinoxy - 11 - keto-12($\beta$)-hydroxycholanate are dissolved in 12.0 ml. of redistilled chloroform and cooled to 0°. 0.4 cc. of redistilled phosphorus tribromide are added dropwise with shaking to the cooled solution. The reaction mixture is stoppered and stored at room temperature (25°) for 22 hours. The excess phosphorus tribromide is hydrolyzed by the addition of a cold saturated solution of sodium bicarbonate to the chloroform solution, shaking and cooling the mixture for 30 minutes. The aqueous solution is extracted several times with chloroform and the combined chloroform extract is washed with sodium carbonate solution and with dilute sodium chloride solution. The chloroform is removed by distillation under diminished pressure giving a pale yellow oil, and the product is crystallized from methanol. It melts at 80–81°, $[\alpha]_D^{25} = -4°$ (chloroform).

9. *Methyl-3(a)-methylsuccinoxy-11-ketocholanate.*—1.36 grams of methyl 3(a)-methylsuccinoxy-11-keto-12-bromocholanate (the pale yellow oil from step 8 before crystallization) are dissolved in 25 ml. of glacial acetic acid, 1.0 gram of zinc dust is added, and the mixture heated under a reflux for 1 hour. The reaction mixture is cooled, the zinc removed by filtration and the solution diluted with water. The product is extracted from the aqueous acetic acid with ether, the ethereal solution washed with sodium carbonate solution and with water, dried over sodium sulfate and the ether removed by distillation. The product crystallizes readily but is purified by chromatographing on aluminum oxide yielding 819 mgm. melting 106–108°. The pure compound melts 113–114°, $[\alpha]_D^{25} = +63°$ (chloroform).

10. *3(a)-hydroxy-11-ketocholanic acid.*—Hydrolysis of the product yields 3(a)-hydroxy-11-ketocholanic acid M. P. 214–217°, identical with the compound prepared by independent methods. The methyl ester of this acid melts 100–103° and is likewise identical with the known product. Oxidation of the methyl ester yields methyl 3,11-diketo cholanate M. P. 83–84° likewise identical with the known compound.

The 3-hydroxy-11-ketocholanic acid obtained in step 10 may be converted to 11-dehydrocorticosterone, for example, by degrading the side chain to the corresponding etiocholanic acid by the method of Wieland and Barbier, building up the ketol side chain by Reichstein's diazo ketone synthesis, and introducing a double bond in the 4-position by bromination followed by dehydrobromination in the known manner.

I claim:
1. A method of preparing 3,11-oxygenated steroids which comprises esterifying the hydroxyl in 3-position of 3,12-dihydroxy-11-ketocholanic acid, converting the part ester thus produced to the methyl ester by treatment with diazomethane, replacing the 12-hydroxy with bromine by treating the methyl ester with phosphorus tribromide, and subjecting the resulting bromo compound to the action of a reducing agent to convert the bromine in 12-position to hydrogen.

2. A method of preparing 3,11-oxygenated steroids which comprises esterifying the hydroxyl in 3-position of 3,12-dihydroxy-11-ketocholanic acid, converting the part ester thus produced to the methyl ester by treatment with diazomethane, replacing the 12-hydroxy with bromine by treating the methyl ester with phosphorus tribromide, and reducing the bromine in 12-position to hydrogen by treating with zinc dust in glacial acetic acid.

3. A method of preparing 3,11-oxygenated steroids which comprises esterifying the hydroxyl in 3-position of 3,12-dihydroxy-11-ketocholanic acid, converting the part ester thus produced to a lower alkyl ester by treatment with an alkylating agent, replacing by halogen the hydroxyl in the 12-position of the part ester thus produced by treatment with a halogenating agent, and subjecting the halogen compound to the action of a reducing agent to convert the halogen in 12-position to hydrogen.

THOMAS F. GALLAGHER.

REFERENCES CITED

The following references are of record in the file of this patent:

UNITED STATES PATENTS

| Number | Name | Date |
| --- | --- | --- |
| 2,321,598 | Hoehn | June 15, 1943 |
| 2,397,656 | Gallagher | Apr. 2, 1946 |
| 2,403,683 | Reichstein | July 9, 1946 |

OTHER REFERENCES

Planer, "Annalen," vol. 118, pages 25–27 (1861).